US012202163B2

(12) United States Patent
Yang et al.

(10) Patent No.: US 12,202,163 B2
(45) Date of Patent: Jan. 21, 2025

(54) ELECTROMECHANICAL DOUBLE-BLADED FRUIT AND VEGETABLE PEELING AND CUTTING MACHINE AND PROCESSING METHOD

(71) Applicant: Liyi Yang, Guangdong (CN)

(72) Inventors: Liyi Yang, Guangdong (CN); Bingzhang Li, Guangdong (CN); Yueming Yu, Guangdong (CN); Yulong Wang, Guangdong (CN); Zenglong Wang, Guangdong (CN)

( * ) Notice: Subject to any disclaimer, the term of this patent is extended or adjusted under 35 U.S.C. 154(b) by 712 days.

(21) Appl. No.: 17/277,295

(22) PCT Filed: Jul. 4, 2019

(86) PCT No.: PCT/CN2019/094693
§ 371 (c)(1),
(2) Date: Mar. 18, 2021

(87) PCT Pub. No.: WO2020/155556
PCT Pub. Date: Aug. 6, 2020

(65) Prior Publication Data
US 2021/0354326 A1 Nov. 18, 2021

(30) Foreign Application Priority Data
Jan. 29, 2019 (CN) .......................... 201910087587.7

(51) Int. Cl.
*A23N 7/10* (2006.01)
*A23L 19/00* (2016.01)
(Continued)

(52) U.S. Cl.
CPC ................ *B26D 7/02* (2013.01); *A23L 19/03* (2016.08); *A23N 7/10* (2013.01); *A23N 15/00* (2013.01);
(Continued)

(58) Field of Classification Search
CPC . A23N 7/00; A23N 7/02; A23N 15/00; A23N 7/026; A23N 7/023; A23N 7/10;
(Continued)

(56) References Cited
U.S. PATENT DOCUMENTS
2004/0089166 A1* 5/2004 Ascari ...................... A23N 7/00
99/584

* cited by examiner

*Primary Examiner* — Hong T Yoo

(57) ABSTRACT

An electromechanical double-bladed fruit and vegetable peeling and cutting machine comprising a holding mechanism (1), a peeling mechanism (2), and a cutting mechanism (3) sequentially provided in a direction of fruit and vegetable processing. The holding mechanism receives and holds a fruit or vegetable, and pushes the fruit or vegetable toward the peeling mechanism for positioning. The peeling mechanism performs positioning, measures actual cutting height of the fruit or vegetable, and adaptively peels the fruit or vegetable by means of two peeling blades. The cutting mechanism removes a top and a bottom portion of the peeled fruit or vegetable, and cuts the fruit or vegetable into pieces. A processing method for the electromechanical double-bladed fruit and vegetable peeling and cutting machine is also disclosed, and comprises: using a holding mechanism to hold and fix a fruit or vegetable in a processing position; using a peeling structure to accurately measure the height of the fruit or vegetable to be processed; using two peeling blades to efficiently and adaptively peel the fruit or vegetable; and finally engaging a pushing cylinder (27), to sequentially push multiple fruits and vegetables toward a cutting blade (37) such that the fruits and vegetables are cut into pieces. A third telescopic cylinder participates in the processing steps by pushing cutting blades such that the bottoms and the tops of the fruits and vegetables are removed. The invention reduces processing time, and improves productivity.

6 Claims, 1 Drawing Sheet

(51) Int. Cl.
*A23N 15/00* (2006.01)
*B26D 1/06* (2006.01)
*B26D 7/02* (2006.01)
*B26D 11/00* (2006.01)

(52) U.S. Cl.
CPC ................ *B26D 1/06* (2013.01); *B26D 11/00* (2013.01); *A23V 2002/00* (2013.01); *B26D 2011/005* (2013.01); *B26D 2210/02* (2013.01)

(58) Field of Classification Search
CPC ...... A23N 15/08; B26D 2210/02; B26D 1/06; B26D 5/007; B26D 5/00; B26D 5/06; B26D 7/02; B26D 7/2628; B26D 3/26; B26D 3/282; B26D 7/01; B26D 7/00; B26D 5/28; B26D 9/00; B23Q 17/24; A47J 17/14; A47J 17/16
See application file for complete search history.

ELECTROMECHANICAL DOUBLE-BLADED FRUIT AND VEGETABLE PEELING AND CUTTING MACHINE AND PROCESSING METHOD

BACKGROUND OF THE INVENTION

The present invention relates to the technical field of furthering processing of fruits and vegetables, and more specifically relates to a kind of electromechanical double-bladed fruit and vegetable peeling and cutting machine and processing method thereof.

In order to increase the commercial value of fruits and vegetables, further processing of fruits and vegetables for example, into juices and nuts, may be required. Prior art methods usually perform manual processing of raw fruits and vegetables. For example, peeling, pitting and cutting are performed manually. Yet, due to corrosive substances such as AHA usually present on the surfaces of the fruits and vegetables, hands may be injured upon a long period of contact with these corrosive substances. Also, given that the fruits and vegetables are processed under an open space, hygiene risks exist, and the processed fruits and vegetables may be easily contaminated. Further, manual processing is not efficient and thus cannot provide greater economic yield for enterprises.

Therefore, automated processing of fruits and vegetables such as embracing and fixing, peeling, trimming heads and tails of the fruits and vegetables, and cutting, is significant to easing the processing procedures and increasing production efficiency.

BRIEF SUMMARY OF THE INVENTION

An object of the present invention is to provide an electromechanical double-bladed fruit and vegetable peeling and cutting machine that is highly effective and reliable. The present invention also discloses a processing method using said electromechanical double-bladed fruit and vegetable peeling and cutting machine, with a view to increasing fruit and vegetable further processing efficiency and lowering the production cost.

To attain the above object of the present invention, the present invention provides an electromechanical double-bladed fruit and vegetable peeling and cutting machine, comprising an embracing mechanism, a peeling mechanism, and a cutting and chopping mechanism arranged sequentially along a further processing direction of fruit and vegetable; the embracing mechanism receives and embraces fruit or vegetable and transports the fruit or vegetable to the peeling mechanism on which the fruit or vegetable is fixed in position; the peeling mechanism fixes the position of the fruit or vegetable, detects an actual peeling height of the fruit or vegetable, and then the peeling mechanism is self-adapted to peel an outer skin of the fruit or vegetable using two peeling blade mechanisms; the cutting and chopping mechanism cuts away top and bottom parts of the peeled fruit or vegetable, and then chops the fruit or vegetable into blocks.

Preferably, the embracing mechanism comprises a first telescopic cylinder fixed on a mounting board of the electromechanical double-bladed fruit and vegetable peeling and cutting machine; a telescopic end of the first telescopic cylinder is connected with a first clamping cylinder and is capable of driving the first clamping cylinder to move towards the peeling mechanism; two ends of the first clamping cylinder are connected to two first mechanical clamps respectively; the two first mechanical clamps are arranged symmetrically; the mounting board is provided with a position fixing hole positioned right below the first mechanical clamps; a photoelectric detector is configured right below the fixing hole; the photoelectric detector is electrically connected with a programmable logic controller (PLC); the first mechanical clamps clamp the fruit or vegetable.

Preferably, the peeling mechanism comprises a detecting rod disposed at an upper portion of a machine frame; the detecting rod detects a height of the fruit or vegetable; also, the detecting rod is disposed inside an upper fixing rod-shaped sleeve and is movably axially inside the upper fixing rod-shaped sleeve; a stroke switch electrically connected with the PLC is provided above the detecting rod; a lower fixing rod co-axial with the upper fixing rod-shaped sleeve is disposed right below the upper fixing rod-shaped sleeve; a top portion of the upper fixing rod-shaped sleeve is driven to move axially by a servo motor gear mechanism; a plurality of belt pulley mechanisms are provided below the lower fixing rod to drive the lower fixing rod to rotate; the two peeling blade mechanisms are disposed centro-symmetrically at two sides of the lower fixing rod respectively to perform outer skin peeling of the fruit or vegetable.

Preferably, each of the two peeling blade mechanisms comprises a peeling blade driving motor disposed on the upper portion of the machine frame, a lower portion of the peeling blade driving motor is connected with a screw, and the screw is connected with a slider; an end of the slider is provided with a removable peeling blade to peel the outer skin of the fruit or vegetable.

Preferably, the cutting and chopping mechanism comprises a second clamping cylinder; two ends of the second clamping cylinder are connected with two second mechanical clamps respectively; the two second mechanical clamps are arranged symmetrically; a cylinder body of the second clamping cylinder is connected with a telescopic end of a second telescopic cylinder; two third telescopic cylinders are symmetrically arranged below the second telescopic cylinder; an end of each of the two third telescopic cylinders is connected with an end of a corresponding cutting blade via a corresponding connecting block; a chopping blade is also provided below the second mechanical clamps to chop the fruit or vegetable into blocks by cooperative up-down movement of a push rod.

Preferably, the cutting blades that cut the top and bottom parts of the fruit or vegetable are disposed horizontally, and the connecting blocks have different lengths; the cutting blades are provided with cutting edges at two opposite sides.

The present invention also provides a processing method using the electromechanical double-bladed fruit and vegetable peeling and cutting machine, comprising the following steps:

Step S1: placing the fruit or vegetable to be processed on the mounting board; using the photoelectric detector to detect presence of the fruit or vegetable, and then sending a signal to the PLC if the presence of the fruit or vegetable is detected; using the PLC to control the first clamping cylinder to drive the first mechanical clamps to move towards each other and clamp the fruit or vegetable when the PLC receives the signal from the photoelectric detector; using the first telescopic cylinder to drive the first clamping cylinder together with the first mechanical clamps to move simultaneously to a position right above the lower fixing rod, and then placing the fruit or vegetable onto a top end of the lower fixing rod; resetting the first telescopic cylinder, the first clamping cylinder and the first mechanical clamps;

Step S2: moving the detecting rod together with the upper fixing rod-shaped sleeve downward towards the fruit or vegetable until the detecting rod abuts against a top end of the fruit or vegetable; as the upper fixing rod-shaped sleeve continues to move downwardly, a top end of the detecting rod contacts the stroke switch which in turns sends an operating signal to the PLC so that the belt pulley mechanisms are activated to drive the lower fixing rod to rotate about an axis thereof that in turns drives the fruit or vegetable to rotate along a central axis thereof;

Step S3: enabling each peeling blade driving motor to drive the corresponding screw to rotate, so as to drive the corresponding slider to move up and down along the corresponding screw to peel the outer skin of the fruit or vegetable via a corresponding arc-shaped blade;

Step S4: after the outer skin of the fruit or vegetable is completely peeled, using the second telescopic cylinder to drive the second clamping cylinder together with the second mechanical clamps to move towards the fruit or vegetable, wherein the second clamping cylinder controls the second mechanical clamps to move away from each other and then clamp the peeled fruit or vegetable by moving towards each other again; resetting the second telescopic cylinder so that the fruit and vegetable is transferred to a position above the chopping blade; also resetting the second telescopic cylinder, the second clamping cylinder and the second mechanical clamps;

Step S5: using a push cylinder to push the push rod downward towards the fruit or vegetable so as to push a lower part of the fruit or vegetable through the chopping blade; an upper part of the fruit or vegetable is also pushed through the chopping blade so that the entire fruit or vegetable is chopped when a next fruit or vegetable is processed through the above steps S1 to S4 and then a lower part of said next fruit or vegetable is pushed downward by the push rod through the chopping blade according to Step S5, thereby enabling said next fruit or vegetable to push the upper part of the current fruit or vegetable through the chopping blade so that the current fruit or vegetable is entirely chopped.

The present invention has the following advantages compared with the prior art.

The present invention places the fruit or vegetable to be processed on the mounting board; after that, using the photoelectric detector to detect presence of the fruit or vegetable, and then sending a signal to the PLC if the presence of the fruit or vegetable is detected; using the PLC to control the first clamping cylinder to drive the first mechanical clamps to move towards each other and clamp the fruit or vegetable when the PLC receives the signal from the photoelectric detector; using the first telescopic cylinder to drive the first clamping cylinder together with the first mechanical clamps to move simultaneously to a position right above the lower fixing rod, and then placing the fruit or vegetable onto a top end of the lower fixing rod; resetting the first telescopic cylinder, the first clamping cylinder and the first mechanical clamps; moving the detecting rod together with the upper fixing rod-shaped sleeve downward towards the fruit or vegetable until the detecting rod abuts against a top end of the fruit or vegetable; as the upper fixing rod-shaped sleeve continues to move downwardly, a top end of the detecting rod contacts the stroke switch which in turns sends an operating signal to the PLC so that the belt pulley mechanisms are activated to drive the lower fixing rod to rotate about an axis thereof that in turns drives the fruit or vegetable to rotate along a central axis thereof; enabling each peeling blade driving motor to drive the corresponding screw to rotate, so as to drive the corresponding slider to move up and down along the corresponding screw to peel the outer skin of the fruit or vegetable via a corresponding arc-shaped blade; after the outer skin of the fruit or vegetable is completely peeled, using the second telescopic cylinder to drive the second clamping cylinder together with the second mechanical clamps to move towards the fruit or vegetable, wherein the second clamping cylinder controls the second mechanical clamps to move away from each other and then clamp the peeled fruit or vegetable by moving towards each other again; resetting the second telescopic cylinder so that the fruit and vegetable is transferred to a position above the chopping blade; also resetting the second telescopic cylinder, the second clamping cylinder and the second mechanical clamps; finally, using a push cylinder to push the push rod downward towards the fruit or vegetable so as to push a lower part of the fruit or vegetable through the chopping blade; an upper part of the fruit or vegetable is also pushed through the chopping blade so that the entire fruit or vegetable is chopped when a next fruit or vegetable is processed through the above steps S1 to S4 and then a lower part of said next fruit or vegetable is pushed downward by the push rod through the chopping blade according to Step S5, thereby enabling said next fruit or vegetable to push the upper part of the current fruit or vegetable through the chopping blade so that the current fruit or vegetable is entirely chopped.

The present invention uses the embracing mechanism to clamp the fruit or vegetable and fix the position of the fruit or vegetable where the fruit or vegetable is being processed. The peeling mechanism achieves precise detection of the processing height of the fruit or vegetable to be processed. The use of the two peeling blade mechanisms is highly efficient and they are self-adapted to perform peeling of the outer skin of the fruit or vegetable. Finally, by using the push cylinder, a plural number of fruits or vegetables are being chopped into blocks by being successively pushed through the chopping blade. Further, by pushing and pulling the cutting blades using the third telescopic cylinders in coordination with different processing stages, the top part and the bottom part of the fruit or vegetable are cut away. The present invention can save processing time and increase production efficiency.

Besides, according to the present invention, the cutting blades horizontally disposed are slanted by a certain degree from a longitudinal axis of a horizontal plane. Slanted configuration of the cutting blades enables the cutting edges of the cutting blades to slide smoothly into the fruit or vegetable during cutting. Accordingly, the cutting edges of the cutting blades will not cut the fruit or vegetable by only using a fixed and relatively tiny location of each cutting edge, and will not cut the fruit or vegetable by direct impact onto the fruit or vegetable, thereby effectively increasing the service life of the cutting blades.

BRIEF DESCRIPTION OF THE DRAWINGS

In order that the technical solutions provided according to the embodiments of the present invention or the prior art are more clearly illustrated, drawings required for the description of the embodiments or the prior art are briefly described below. Obviously, the drawings described below are intended to illustrate only some of the embodiments of the present invention. Given that no inventive effort is required, a person skilled in the art may obtain other drawings based on the drawings described below.

REFERENCES IN THE FIGURES

| No. | |
|---|---|
| 1 | Embracing mechanism |
| 11 | Belt pulley mechanisms |
| 12 | First telescopic cylinder |
| 13 | First clamping cylinder |
| 14 | First mechanical clamps |
| 15 | Mounting board |
| 151 | Position fixing hole |
| 2 | Peeling mechanism |
| 21 | Servo motor gear mechanism |
| 22 | Peeling blade driving motor |
| 23 | Upper fixing rod-shaped sleeve |
| 231 | Detecting rod |
| 24 | Lower fixing rod |
| 25 | Arc-shaped blade |
| 26 | Slider |
| 27 | Push cylinder |
| 3 | Cutting and chopping mechanism |
| 31 | Second telescopic cylinder |
| 32 | Connecting block |
| 33 | Cutting blade |
| 34 | Second mechanical clamps |
| 35 | Third telescopic cylinders |
| 36 | Second clamping cylinder |
| 37 | Chopping blade |
| 4 | Machine frame |

The technical solutions, the functional characteristics as well as the advantages of the present invention will be further described below using an embodiment and with reference to the drawings.

DETAILED DESCRIPTION OF THE INVENTION

The technical solutions according to an embodiment of the present invention will be clearly and thoroughly described below with reference to the drawings illustrating the embodiment. Obviously, the described embodiment is only one but not all of the possible embodiments of the present invention. Given that no inventive effort is required, all other embodiments obtained by a person skilled in this field of art in accordance with the teachings of the embodiment described in the present invention should also fall within the scope of protection of the present invention.

It should be noted that, directional indications (e.g. up, down, left, right, front, rear etc.) used in the following description of the embodiment of the present invention are intended only to indicate relative positional relationships and relative movements etc. of the described components under certain specific configurations (e.g. those shown by the drawings). If changes occur to the specific configurations, directional indications should also change correspondingly.

Besides, use of the terms like "first" and "second" in the description of the embodiment of the present invention are intended to be illustrative only, and should not be understood as indicating or suggesting relative importance or implying a quantity of the described technical feature. Therefore, a feature defined as "first" or "second" may be clearly described or implied that a quantity of the described feature is at least one. Further, the technical features between different embodiments can be mutually integrated provided that such integration is achievable by a person skilled in the art. If an integration of technical solutions causes contradictions or is not achievable, such integrated technical solution should be considered non-existing and should not fall within the scope of protection claimed by the present invention.

The present invention provides an electromechanical double-bladed fruit and vegetable peeling and cutting machine.

Figure 1:
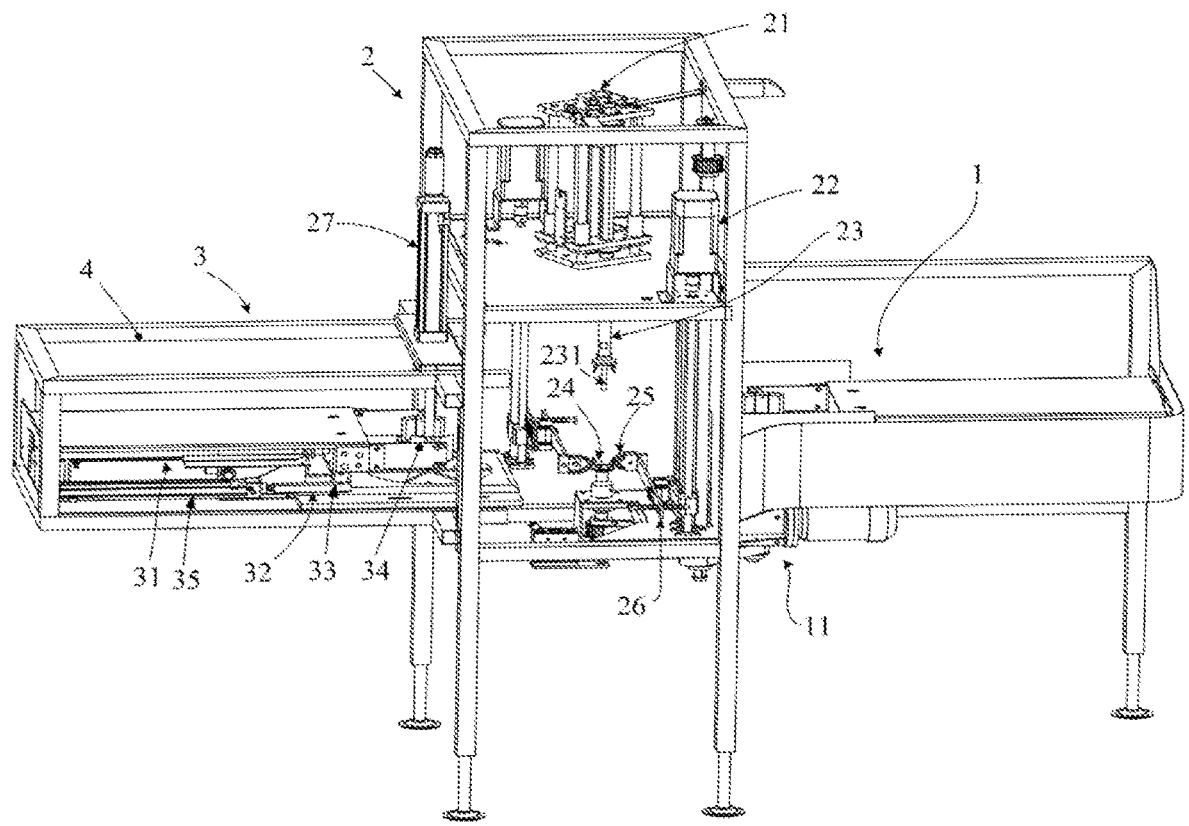
FIG. 1 is a schematic perspective structural view of an electromechanical double-bladed fruit and vegetable peeling and cutting machine according to an embodiment of the present invention.
Figure 2:
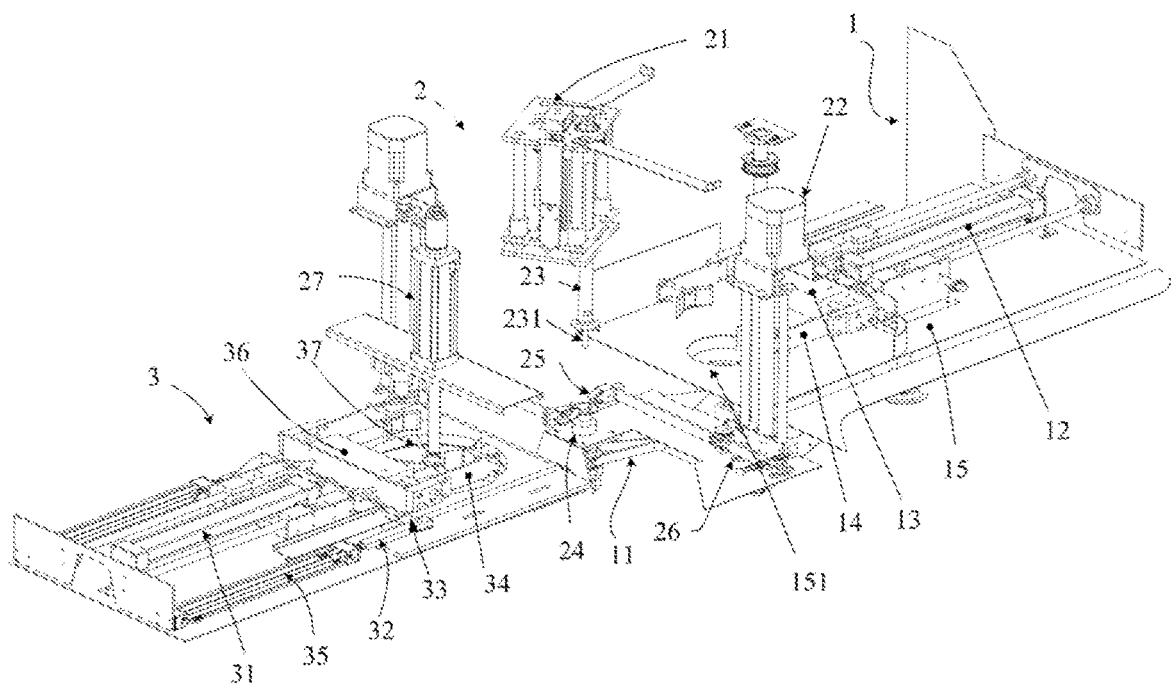
FIG. 2 is a partial structural view of the electromechanical double-bladed fruit and vegetable peeling and cutting machine according to an embodiment of the present invention.

As shown in FIGS. 1-2, the present invention provides an electromechanical double-bladed fruit and vegetable peeling and cutting machine, mainly comprising an embracing mechanism 1, a peeling mechanism 2, and a cutting and chopping mechanism 3 arranged sequentially along a further processing direction of fruit and vegetable. The embracing mechanism 1 receives and embraces fruit or vegetable and transports the fruit or vegetable to the peeling mechanism 2 on which the fruit or vegetable is fixed in position; the peeling mechanism 2 fixes the position of the fruit or vegetable, detects an actual peeling height of the fruit or vegetable, and then the peeling mechanism is self-adapted to peel an outer skin of the fruit or vegetable using two peeling blade mechanisms; the cutting and chopping mechanism 3 cuts away top and bottom parts of the peeled fruit or vegetable, and then chops the fruit or vegetable into blocks.

The embracing mechanism 1 comprises a first telescopic cylinder 12 fixed on a mounting board 15 of the electromechanical double-bladed fruit and vegetable peeling and cutting machine; a telescopic end of the first telescopic cylinder 12 is connected with a cylinder body of a first clamping cylinder 13; two ends of the first clamping cylinder 13 are synchronous operating ends; the two synchronous operating ends of the first clamping cylinder 13 are connected to two first mechanical clamps 14 respectively; the two first mechanical clamps 14 are arranged symmetrically; the mounting board 15 is provided with a position fixing hole 151 positioned right below the first mechanical clamps 14; a photoelectric detector that detects presence of the fruit and vegetable is configured right below the fixing hole 151; the photoelectric detector is connected with a programmable logic controller (PLC); when user places the fruit or vegetable to be processed at the position fixing hole 151, detecting signal from the photoelectric detector will be interrupted by the fruit and vegetable, indicating presence of the fruit or vegetable; hence, the photoelectric detector transmits a signal of the presence of the fruit or vegetable to the PLC; then the PLC controls the first clamping cylinder 13 to drive the first mechanical clamps 14 at a left end and a right end of the first clamping cylinder 13 respectively to move towards each other so as to clamp the fruit or vegetable; then the PLC controls the telescopic end of the first telescopic cylinder 12 to extend outwardly from the first telescopic cylinder, so that the first mechanical clamps 14 clamping the fruit or vegetable are driven to move forward along the further processing direction up to a position right above a lower fixing rod 24; when the first mechanical clamps 14 release their clamping strength of the fruit or vegetable, the fruit or vegetable can be stably placed on a top end of the lower fixing rod 24 and supported by the lower fixing rod 24; and then, the telescopic end of the first telescopic cylinder 12 retracts backwardly opposite to the further processing direction to pull back the first clamping cylinder 13, and the first mechanical clamps 14 are also pulled back accordingly and then reset.

The peeling mechanism 2 in the present embodiment comprises a detecting rod 231 disposed at an upper portion of a machine frame 4; the detecting rod 231 detects a height of the fruit or vegetable; also, the detecting rod 231 is disposed inside an upper fixing rod-shaped sleeve 23 and is movably axially inside the upper fixing rod-shaped sleeve 23; a stroke switch is provided above the detecting rod 231 and is spaced apart from a top end of the detecting rod 231 by a certain distance; the lower fixing rod 24 co-axial with the upper fixing rod-shaped sleeve 23 is disposed right below the upper fixing rod-shaped sleeve 23; a top portion of the upper fixing rod-shaped sleeve 23 is driven to move axially by using a servo motor gear mechanism 21; a plurality of belt pulley mechanisms 11 are provided below the lower fixing rod 24 to drive the lower fixing rod 24 to rotate; the two peeling blade mechanisms are disposed centro-symmetrically at two sides of the lower fixing rod 24 respectively to perform outer skin peeling of the fruit or vegetable; each of the two peeling blade mechanisms comprises a peeling blade driving motor 22 disposed on the upper portion of the machine frame 4, a lower portion of the peeling blade driving motor 22 is connected with screw, and the screw is connected with a slider 26; an end of the slider 26 is provided with a removable peeling blade to peel the outer skin of the fruit or vegetable; preferably, the removable peeling blade according to the present embodiment is an arc-shaped blade 25, and two ends of the arc-shaped blade 25 are clamped and fixed using a clamping block.

After the fruit or vegetable to be processed is placed at the top end of the lower fixing rod 24 by using the first mechanical clamps 14, the PLC drives a servo motor of the servo motor gear mechanism 21 to rotate, and thus drives the upper fixing rod-shaped sleeve 23 and the detecting rod 231 by gears to move downward simultaneously; as the detecting rod 231 moves downward gradually, a lower end of the detecting rod 231 will abut against a top end of the fruit or vegetable, while the upper fixing rod-shaped sleeve 23 will still continue to move downward; as such, the top end of the detecting rod 231 will eventually contact with the stroke switch which in turns sends a control signal to the PLC to stop operation of the servo motor; accordingly, the upper fixing rod-shaped sleeve 23 will stop from moving downward and will cooperate with the upper end of the lower fixing rod 24 to clamp and fix the fruit or vegetable in between. Next, the lower fixing rod 24 is driven to rotate via the plurality of belt pulley mechanisms 11 provided below the lower fixing rod 24, such that the entire fruit or vegetable will be driven to rotate accordingly; further, when the entire fruit or vegetable is rotating, the PLC controls an operating end of the peeling blade driving motor 22 of each of the peeling blade mechanisms to rotate the respective screw so that the slider 26 of each of the peeling blade mechanisms can move along an axial direction of the respective screw to perform peeling of the outer skin of the fruit or vegetable, wherein the respective arc-shaped blade 25 cuts into the skin of the fruit or vegetable so as to peel the skin of the fruit or vegetable. When the slider 26 completes its journey along the axial direction of the respective screw from bottom to top of the fruit or vegetable, or from top to bottom of the fruit or vegetable, peeling of the outer skin of the fruit or vegetable is completed. In order to improve the peeling effect of the outer skin of the fruit or vegetable by the respective arc-shaped blade 25, the present embodiment configures a spring and a bolt at an end of each slider 26 opposite to an end of which disposed with the respective arc-shaped blade, wherein the spring sleeves the bolt, and by adjusting a tightness of the spring, different pressures can be created by the arc-shaped blade 25 on a surface of the fruit or vegetable, and thus achieving different cutting depths into the surface of the fruit or vegetable. As such, peeling depth can be adaptively adjusted according to different kinds of fruits or vegetables.

The cutting and chopping mechanism 3 according to the present embodiment comprises a second telescopic cylinder 31; a cylinder body of the second telescopic cylinder 31 is fixedly connected with the machine frame 4; a telescopic end of the second telescopic cylinder 31 is connected with a cylinder body of a second clamping cylinder 36; the second clamping cylinder 36 has two operating ends; the two operating ends of the second clamping cylinder 36 are connected with two second mechanical clamps 34 respectively; also, two third telescopic cylinders 35 are symmetrically arranged below the second telescopic cylinder 31; an end of each of the two third telescopic cylinders 35 is connected with an end of a corresponding cutting blade 33 via a connecting block; a chopping blade 37 is also provided below the second mechanical clamps 34 to chop the fruit or vegetable into blocks. After the outer skin of the fruit or vegetable is peeled, the PLC controls the two third telescopic cylinders 35 to move synchronously towards the fruit or vegetable, and as such, the cutting blades 33 can cut away a bottom part of the fruit or vegetable; after the bottom part of the fruit or vegetable is cut away by the cutting blades 33, the third telescopic cylinders 35 stop, and the telescopic end of the second telescopic cylinder 31 extends such that the second clamping cylinder 36 and the second mechanical clamps 34 are simultaneously driven to move towards the fruit or vegetable; also, while moving towards the fruit or vegetable, the second clamping cylinder 36 expands by moving the two operating ends away from each other so that the two second mechanical clamps 34 symmetrically arranged at the two operating ends respectively also move away from each other respectively. When the second mechanical clamps 34 moving away from each other reach two opposite outer sides of the fruit or vegetable respectively, the two mechanical clamps 34 are controlled to move towards each other again via the second clamping cylinder 36 to clamp the peeled fruit or vegetable. Next, the telescopic end of the second telescopic cylinder 31 retracts in order to reset its original position, and as such, the fruit and vegetable is moved right above the chopping blade 37; and then a push rod disposed above the chopping blade 37 is pushed downwardly towards the fruit or vegetable via a push cylinder 27 so that a lower portion of the fruit or vegetable is pushed through the chopping blade 37, and meanwhile, the third telescopic cylinders 35 retracts to reset their original positions, and as such, the cutting blades 33 are pulled back to reset; since cutting edges are provided at two opposite sides of each of the cutting blades respectively, the top part of the fruit or vegetable is cut away by an opposite cutting edge as opposed to the cutting edge that cuts the bottom part of the fruit or vegetable as the cutting blades 33 are pulled back to reset. When the next peeled fruit or vegetable is transferred to a position above the previous peeled fruit or vegetable and as said next peeled fruit or vegetable is being pushed downwardly, an upper part of the fruit or vegetable with the top part already cut away is entirely pushed through the chopping blade 37 such that said previous peeled fruit or vegetable is entirely chopped into blocks.

Besides, in the present embodiment, the cutting blades 33 that cut the top and bottom parts of the fruit or vegetable are disposed horizontally, and the connecting blocks 32 which the cutting blades 33 are connected thereto respectively with their respective ends have different lengths. As such, the cutting blades 33 are slanted by a certain degree from a longitudinal axis of a horizontal plane. During implementation, the applicant has found that slanted configuration of the cutting blades 33 enables the cutting edges of the cutting blades 33 to slide smoothly into the fruit or vegetable during cutting. Accordingly, the cutting edges of the cutting blades 33 will not cut the fruit or vegetable by only using a fixed and relatively tiny location of each cutting edge, and will not cut the fruit or vegetable by direct impact onto the fruit or vegetable as in the prior art. After a long period of use, the technical solution provided by the present invention can effectively increase the service life of the cutting blades.

With reference to FIGS. 1-2, the present invention also provides a processing method using the electromechanical double-bladed fruit and vegetable peeling and cutting machine, comprising the following steps:

Step S1: placing the fruit or vegetable to be processed on the mounting board; using the photoelectric detector to detect presence of the fruit or vegetable, and then sending a signal to the PLC if the presence of the fruit or vegetable is detected; using the PLC to control the first clamping cylinder 13 to drive the first mechanical clamps 14 to move towards each other and clamp the fruit or vegetable when the PLC receives the signal from the photoelectric detector; using the first telescopic cylinder 12 to drive the first clamping cylinder 13 together with the first mechanical clamps 14 to move simultaneously to a position right above the lower fixing rod 24, and then placing the fruit or vegetable onto the top end of the lower fixing rod 24; resetting the first telescopic cylinder 12, the first clamping cylinder 13 and the first mechanical clamps 14;

Step S2: moving the detecting rod 231 together with the upper fixing rod-shaped sleeve 23 downward towards the fruit or vegetable until the detecting rod 231 abuts against the top end of the fruit or vegetable; as the upper fixing rod-shaped sleeve continues to move downwardly, the top end of the detecting rod 231 contacts the stroke switch which in turns sends an operating signal to the PLC so that the belt pulley mechanisms 11 are activated to drive the lower fixing rod 24 to rotate about an axis thereof that in turns drives the fruit or vegetable to rotate along a central axis thereof;

Step S3: enabling each peeling blade driving motor 22 to drive the corresponding screw to rotate, so as to drive the corresponding slider 26 to move up and down along the corresponding screw to peel the outer skin of the fruit or vegetable via the corresponding arc-shaped blade 25;

Step S4: after the outer skin of the fruit or vegetable is completely peeled, using the second telescopic cylinder 31 to drive the second clamping cylinder 36 together with the second mechanical clamps 34 to move towards the fruit or vegetable, wherein the second clamping cylinder 36 controls the second mechanical clamps 34 to move away from each other and then clamp the peeled fruit or vegetable by moving towards each other again; resetting the second telescopic cylinder 31 so that the fruit and vegetable is transferred to a position above the chopping blade 37; also resetting the second telescopic cylinder 31, the second clamping cylinder 36 and the second mechanical clamps 34;

Step S5: using the push cylinder 27 to push the push rod downward towards the fruit or vegetable so as to push the lower part of the fruit or vegetable through the chopping blade 37; the upper part of the fruit or vegetable is also pushed through the chopping blade 37 so that the entire fruit or vegetable is chopped when a next fruit or vegetable is processed through the above steps S1 to S4 and then a lower part of said next fruit or vegetable is pushed downward by the push rod through the chopping blade 37 according to Step S5, thereby enabling said next fruit or vegetable to push the upper part of the current fruit or vegetable through the chopping blade so that the current fruit or vegetable is entirely chopped.

Only a preferred embodiment of the present invention is described above. The described embodiment should not limit the scope of the present invention. Any structural changes achieving the same technical effects based on the description and drawings of the present invention and in accordance with the teachings of the present invention, or use of the present invention directly or indirectly in other related fields, should fall within the scope of protection of the present invention.

What is claimed is:

1. An electromechanical double-bladed fruit and vegetable peeling and cutting machine, comprising an embracing mechanism, a peeling mechanism, and a cutting and chopping mechanism arranged sequentially along a processing direction of fruit and vegetable; the embracing mechanism receives and embraces fruit or vegetable and transports the fruit or vegetable to the peeling mechanism on which the fruit or vegetable is fixed in position; the peeling mechanism fixes the position of the fruit or vegetable, detects a peeling height of the fruit or vegetable, and the peeling mechanism is self-adapted to peel an outer skin of the fruit or vegetable using two peeling blade mechanisms to obtain peeled fruit or vegetable; the cutting and chopping mechanism cuts away top and bottom parts of the peeled fruit or vegetable, and then chops the peeled fruit or vegetable into blocks;

the embracing mechanism comprises a first telescopic cylinder fixed on a mounting board of the electromechanical double-bladed fruit and vegetable peeling and cutting machine; a telescopic end of the first telescopic cylinder is connected with a first clamping cylinder and is capable of driving the first clamping cylinder to move towards the peeling mechanism; two ends of the first clamping cylinder are connected to two first mechanical clamps respectively; the two first mechanical clamps are arranged symmetrically; the mounting board is provided with a position fixing hole positioned right below the first mechanical clamps; a photoelectric detector is configured right below the fixing hole; the photoelectric detector is electrically connected with a programmable logic controller (PLC); the first mechanical clamps clamp the fruit or vegetable.

2. The electromechanical double-bladed fruit and vegetable peeling and cutting machine of claim 1, wherein the peeling mechanism comprises a detecting rod disposed at an upper portion of a machine frame; the detecting rod detects a height of the fruit or vegetable; also, the detecting rod is disposed inside an upper fixing rod-shaped sleeve and is movably axially inside the upper fixing rod-shaped sleeve; a stroke switch electrically connected with the PLC is provided above the detecting rod; a lower fixing rod co-axial with the upper fixing rod-shaped sleeve is disposed right below the upper fixing rod-shaped sleeve; a top portion of the upper fixing rod-shaped sleeve is driven to move axially by a servo motor gear mechanism; a plurality of belt pulley mechanisms are provided below the lower fixing rod to drive the lower fixing rod to rotate; the two peeling blade mechanisms are disposed centro-symmetrically at two sides of the lower fixing rod respectively to perform outer skin peeling of the fruit or vegetable.

3. The electromechanical double-bladed fruit and vegetable peeling and cutting machine of claim 2, wherein each of the two peeling blade mechanisms comprises a peeling blade driving motor disposed on the upper portion of the machine frame, a lower portion of the peeling blade driving motor is connected with a screw, and the screw is connected with a slider; an end of the slider is provided with a removable peeling blade to peel the outer skin of the fruit or vegetable.

4. The electromechanical double-bladed fruit and vegetable peeling and cutting machine of claim 3, wherein the cutting and chopping mechanism comprises a second clamping cylinder; two ends of the second clamping cylinder are connected with two second mechanical clamps respectively; the two second mechanical clamps are arranged symmetrically; a cylinder body of the second clamping cylinder is connected with a telescopic end of a second telescopic cylinder; two third telescopic cylinders are symmetrically arranged below the second telescopic cylinder; an end of each of the two third telescopic cylinders is connected with an end of a corresponding cutting blade via a corresponding connecting block; a chopping blade is also provided below the second mechanical clamps to chop the peeled fruit or vegetable into blocks by cooperative up-down movement of a push rod driven by a push cylinder.

5. The electromechanical double-bladed fruit and vegetable peeling and cutting machine of claim 4, wherein the cutting blades that cut the top and bottom parts of the peeled fruit or vegetable are disposed horizontally, and the connecting blocks have different lengths; the cutting blades are provided with cutting edges at two opposite sides.

6. A processing method using the electromechanical double-bladed fruit and vegetable peeling and cutting machine of claim 5, comprising the following steps:

Step S1: placing the fruit or vegetable to be processed on the mounting board; using the photoelectric detector to detect presence of the fruit or vegetable, and then sending a signal to the PLC if the presence of the fruit or vegetable is detected; using the PLC to control the first clamping cylinder to drive the first mechanical clamps to move towards each other and clamp the fruit or vegetable when the PLC receives the signal from the photoelectric detector; using the first telescopic cylinder to drive the first clamping cylinder together with the first mechanical clamps to move simultaneously to a position right above the lower fixing rod, and then placing the fruit or vegetable onto a top end of the lower fixing rod; resetting the first telescopic cylinder, the first clamping cylinder and the first mechanical clamps;

Step S2: moving the detecting rod together with the upper fixing rod-shaped sleeve downward towards the fruit or vegetable until the detecting rod abuts against a top end of the fruit or vegetable; as the upper fixing rod-shaped sleeve continues to move downwardly, a top end of the detecting rod contacts the stroke switch which in turns sends an operating signal to the PLC so that the belt pulley mechanisms are activated to drive the lower fixing rod to rotate about an axis thereof that in turns drives the fruit or vegetable to rotate along a central axis thereof;

Step S3: enabling each peeling blade driving motor to drive the corresponding screw to rotate, so as to drive the corresponding slider to move up and down along the corresponding screw to peel the outer skin of the fruit or vegetable via a corresponding arc-shaped blade;

Step S4: after the outer skin of the fruit or vegetable is completely peeled such that peeled fruit or vegetable is obtained, using the second telescopic cylinder to drive the second clamping cylinder together with the second mechanical clamps to move towards the peeled fruit or vegetable, wherein the second clamping cylinder controls the second mechanical clamps to move away from each other and then clamp the peeled fruit or vegetable by moving towards each other again; resetting the second telescopic cylinder so that the peeled fruit or vegetable is transferred to a position above the chopping blade; also resetting the second telescopic cylinder, the second clamping cylinder and the second mechanical clamps;

Step S5: using the push cylinder to push the push rod downward towards the peeled fruit or vegetable so as to push a lower part of the peeled fruit or vegetable through the chopping blade; an upper part of the peeled fruit or vegetable is also pushed through the chopping blade so that the peeled fruit or vegetable is chopped when a next peeled fruit or vegetable is processed through the above steps S1 to S4 and then a lower part of said next peeled fruit or vegetable is pushed downward by the push rod through the chopping blade according to Step S5, thereby enabling said next peeled fruit or vegetable to push the upper part of the peeled fruit or vegetable through the chopping blade so that the peeled fruit or vegetable is entirely chopped.

* * * * *